United States Patent
Zhang et al.

(10) Patent No.: US 10,120,562 B2
(45) Date of Patent: Nov. 6, 2018

(54) IMPLEMENTATION METHOD FOR USER INTERFACE OF MOBILE DEVICE, AND MOBILE DEVICE

(71) Applicant: Shanghai Holaverse Network Technology Co. Ltd., Shanghai (CN)

(72) Inventors: Yang Zhang, Beijing (CN); Kai Yu, Beijing (CN); Jiankai Zhao, Beijing (CN)

(73) Assignee: Shanghai Holaverse Network Technology Co. Ltd., Shanghai (CN)

( * ) Notice: Subject to any disclaimer, the term of this patent is extended or adjusted under 35 U.S.C. 154(b) by 493 days.

(21) Appl. No.: 14/765,298

(22) PCT Filed: May 6, 2014

(86) PCT No.: PCT/CN2014/076901
§ 371 (c)(1),
(2) Date: Jul. 31, 2015

(87) PCT Pub. No.: WO2014/183577
PCT Pub. Date: Nov. 20, 2014

(65) Prior Publication Data
US 2015/0378593 A1  Dec. 31, 2015

(30) Foreign Application Priority Data
May 16, 2013 (CN) .......................... 2013 1 0182307

(51) Int. Cl.
*G06F 3/0488* (2013.01)
*G06F 3/0481* (2013.01)
(Continued)

(52) U.S. Cl.
CPC ........ *G06F 3/04883* (2013.01); *G06F 3/0481* (2013.01); *G06F 3/0482* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2009/0019397 A1* | 1/2009 | Buffet | ................... | G06F 3/0482 715/837 |
| 2010/0083190 A1* | 4/2010 | Roberts | ............... | G06F 3/04883 715/863 |

(Continued)

FOREIGN PATENT DOCUMENTS

| | | |
|---|---|---|
| CN | 102750108 A | 10/2012 |
| CN | 102830895 A | 12/2012 |

(Continued)

OTHER PUBLICATIONS

International Patent Application No. PCT/CN2014/076901; Int'l Search Report; dated Aug. 4, 2014; 2 pages.

*Primary Examiner* — Doon Chow
*Assistant Examiner* — Wendy Nicholas
(74) *Attorney, Agent, or Firm* — Baker & Hostetler LLP

(57) ABSTRACT

The present invention discloses an implementation method of user interface for a mobile device and a mobile device. Herein, the method comprises: detecting a trigger action on the mobile device; in response to the trigger action, displaying n layers of response region, wherein the n layers of response region are transparent rectangle, and overlap at one of their corners or edges, calculating display position(s) of one or more UI element(s), and presenting the UI element(s) in the valid region of each layer of response region. In the present invention, the sector UI may provide the user with a convenient access to opening an application corresponding to the UI element.

11 Claims, 8 Drawing Sheets

(51) Int. Cl.
*G06F 3/0482* (2013.01)
*G06F 3/0484* (2013.01)
*H04M 1/725* (2006.01)

(52) U.S. Cl.
CPC ...... *G06F 3/04817* (2013.01); *G06F 3/04842* (2013.01); *G06F 3/04886* (2013.01); *H04M 1/72583* (2013.01)

(56) References Cited

U.S. PATENT DOCUMENTS

| | | | | |
|---|---|---|---|---|
| 2010/0124946 A1* | 5/2010 | Chun | .................. | G06F 3/0416 455/566 |
| 2012/0081389 A1* | 4/2012 | Dilts | .................. | G06F 3/04812 345/619 |
| 2012/0192108 A1* | 7/2012 | Kolb | .................. | G06F 3/0482 715/810 |
| 2014/0033116 A1* | 1/2014 | Jakobs | .................. | G06F 3/0481 715/788 |
| 2014/0075388 A1* | 3/2014 | Kuscher | ................ | G06F 3/0482 715/834 |
| 2014/0181720 A1* | 6/2014 | Chen | .................... | G06F 3/0482 715/773 |
| 2015/0058769 A1* | 2/2015 | Kim | ........................ | G06F 9/451 715/765 |
| 2015/0302827 A1* | 10/2015 | Danielsson | ............ | G01C 23/00 345/581 |

FOREIGN PATENT DOCUMENTS

| | | |
|---|---|---|
| CN | 102915173 A | 2/2013 |
| CN | 102937874 A | 2/2013 |
| CN | 103226446 A | 7/2013 |
| CN | 103279266 A | 9/2013 |

* cited by examiner

IMPLEMENTATION METHOD FOR USER INTERFACE OF MOBILE DEVICE, AND MOBILE DEVICE

CROSS-REFERENCE TO RELATED APPLICATIONS

This application is a National Phase Application of Application No. PCT/CN2014/076901, filed May 6, 2014, which claims priority to Chinese Patent Application No. 201310182307.3, filed May 16, 2013, the disclosures of which are incorporated by reference in their entireties.

TECHNICAL FIELD

The present invention is related to the field of smart terminal, and in particular, to a mobile device, an implementation methods of user interface for a mobile device, a computer program and a computer readable medium.

BACKGROUND ART

With the rapid development of the smart terminal technology, various applications provided for a smart terminal are more and more abundant. It follows then that increased number of application icons are necessarily presented in user interface (hereinafter referred to as UI) of the smart terminal. Taking a smart phone using Android system as an example, this system may provide a user with a number of installed applications. In UI of the system, application icons corresponding to the applications are displayed in a form of page-by-page. When the user is searching for an application icon, he/she has to browse page by page. The operations of this kind of search manner would be complicated and lack of efficiency.

SUMMARY OF THE INVENTION

In view of the above problems, the present invention is proposed to provide a mobile device and a related implementation method of UI for the mobile device, to overcome the above problems or at least partially solve or relieve the above problems.

According to one aspect of the present invention, there is provided an implementation method of UI for a mobile device, which comprises: detecting a trigger action on the mobile device; in response to the trigger action, displaying n layers of response region, wherein n>1, the n layers of response region are transparent rectangle, and overlap at one of their corners or edges, wherein the mth layer of response region is larger than the m−1th layer of response region, m∈[2, n]; a valid region of the $1^{st}$ layer of response region is a sector region, and valid regions of the $2^{nd}$ to the nth layers of response region are annulus sector regions; the valid regions of the n layers of response region do not overlap each other; and calculating display position(s) of one or more UI element, and presenting the UI element(s) in the valid region of each layer of response region.

According to another aspect of the present invention, there is provided a mobile device, which comprises: a detector, configured to detect a trigger action on the mobile device; a first display, configured to, in response to the trigger action, display n layers of response region, wherein n>1, the n layers of response region are rectangular region, and overlap at one of their corners or edges, wherein the mth layer of response region is larger than the m−1th layer of response region, m∈[2, n]; a valid region of the $1^{st}$ layer of response region is a sector region, and valid regions of the $2^{nd}$ to the nth layers of response region are annulus sector regions; the valid regions of the n layers of response region do not overlap each other; a calculator, configured to calculate display position(s) of one or more UI element; and a second display, configured to, according to result(s) calculated by the calculator, present the UI element(s) in the valid region of each layer of response region.

According to still another aspect of the present invention, there is provided a computer program, which comprises computer readable codes, wherein a mobile device executes the implementation method of UI for the mobile device according to any one of claims 1-7 when the computer readable codes are operated on the mobile device.

According to still yet another aspect of the present invention, there is provided a computer readable medium, in which the computer program according to claim 15 is stored.

Advantages of the present invention are as follows:

In the mobile device and the implementation method of UI for the mobile device provided by the present invention, the sector UI may provide the user with a convenient access to open an application corresponding to a UI element. This access is global, which may solve a problem that it is difficult for the user to search applications when using a smart terminal. The mobile device can display the sector UI according to the user's trigger action and provide a convenient and flexible activation, without affecting operations of other applications and aesthetics of the entire UI. The sector UI may comprise n layers of response region, each of which can present one or more UI element so as to provide a number of applications. By judging the gestures, the present invention may provide the user with a number of gesture operations such as a slide for activating the interface, switching the tags, a click for opening an application, and the like.

The above description is merely an overview of the technical solution of the present invention. In order to more clearly understand the technical solution of the present invention to implement in accordance with the contents of the specification and to make the foregoing and other objects, features and advantages of the present invention more apparent, detailed embodiments of the present invention will be provided below.

BRIEF DESCRIPTION OF THE DRAWINGS

Various other advantages and benefits will become apparent to those of ordinary skills in the art by reading the following detailed description of the preferred embodiments. The drawings are merely provided for the purpose of illustrating the preferred embodiments and should not be considered to be limiting to the present invention. Further, throughout the drawings, like reference signs indicate like components. In the drawings.

DETAILED DESCRIPTION OF THE EMBODIMENTS

The present invention will be further described in connection with the drawings and the particular embodiments hereinafter.

Figure 1:
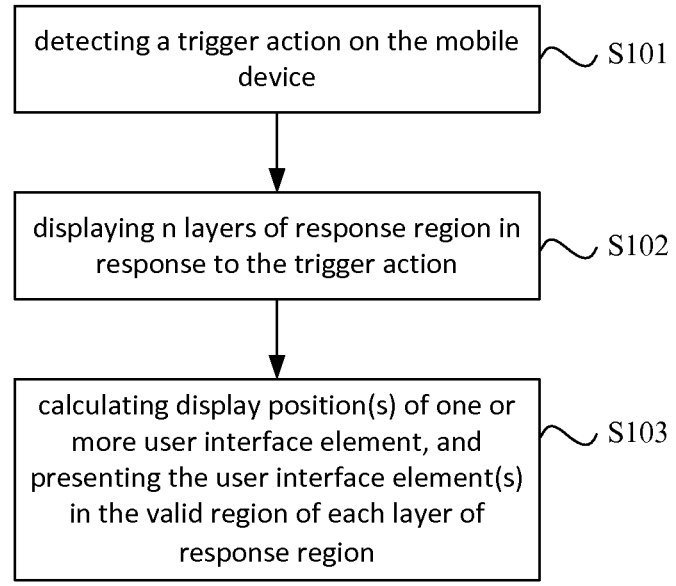
FIG. 1 shows a flow chart illustrating an implementation method of UI for a mobile device according to one embodiment of the present invention.

FIG. 1 shows a flow chart illustrating an implementation method 100 of UI for a mobile device according to one embodiment of the present invention. As it can be seen from FIG. 1, this method is first to detect a trigger action on the mobile device; and in response to the trigger action, to display n layers of response region, wherein the response region is a transparent rectangle which is unperceived to a user; the n layers of response region overlap at one of their corners or edges, and from the 1$^{st}$ layer of response region, areas of various layers of response region increase sequentially. Each layer of response region may be divided into a valid region and an invalid region. Optionally, non-transparent image may be displayed in the valid region, such that the user could perceive the valid region. The valid region of the 1$^{st}$ layer of response region is a sector region, and the valid regions of the 2$^{nd}$ to the nth layers of response region are annulus sector regions. The valid regions of the n layers of response region do not overlap with each other, in such a manner that the valid regions of the n layers of response region are combined to form a sector UI. Then, the method is to calculate display position(s) of one or more UI element, and to present the UI element(s) in the valid region of each layer of response region, whereby implementing the sector UI and the UI element(s) presented thereon in the mobile device, and then providing a convenient access for the user to open application(s) corresponding to the UI element(s).

As shown in FIG. 1 again, the method 100 starts with step S101: detecting a trigger action on the mobile device. This method could activate the display of UI through detecting the trigger action of the user on the mobile device. Herein, the trigger action may include a click or a double-click action on a designated button; or a sliding action from the lower right corner toward the upper left of a screen; or a sliding action from the lower left corner toward the upper right of a screen; or a sliding action from the upper right corner toward the lower left of a screen; or a sliding action from the upper left corner toward the lower right of a screen; or a sliding action from one side toward the opposite side of a screen; or the like. Whereas, the above mentioned trigger actions should not be considered as limiting the scope of the present invention.

Figure 2:
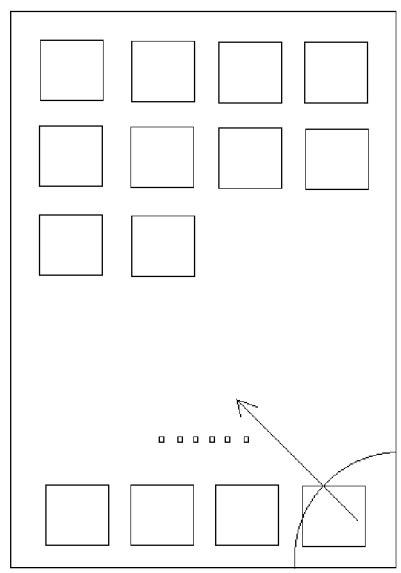
FIG. 2 shows a schematic diagram illustrating a trigger action of a user on a mobile device according to one embodiment of the present invention.

FIG. 2 shows a schematic diagram illustrating the trigger action of the user on the mobile device according to one embodiment of the present invention. As shown in FIG. 2, based on the screen provided by the mobile device, the user may activate the UI by the sliding action from the lower right corner toward the upper left of the screen, and then the UI will be displayed in the lower right corner of the screen. This method may define a valid range for the sliding action. If a coordinate system is established by taking the lower right corner of the screen as an origin, according to one embodiment of the present invention, the valid range may be defined as an angular range [110°, 120°]. The angular range may be determined based on a vector related with gesture, and the starting point of the vector is not necessarily positioned at the origin of the coordinate system. To activate the UI, the vector angle of the sliding action is required to be positioned within the valid range. Also, the practical judgement of the vector angle could be made by a tangent value which is able to indicate angle. For example, the valid range is set to a tangent value range, such as [tg 110°, tg 210°]. After a sliding action on the mobile device is detected, it may proceed to calculate, based on coordinates of the starting point and the ending point of the sliding action, the tangent value of the vector angle of the sliding action, and to decide whether the tangent value falls in the above tangent value range; if so, the UI will be activated.

Figure 3:
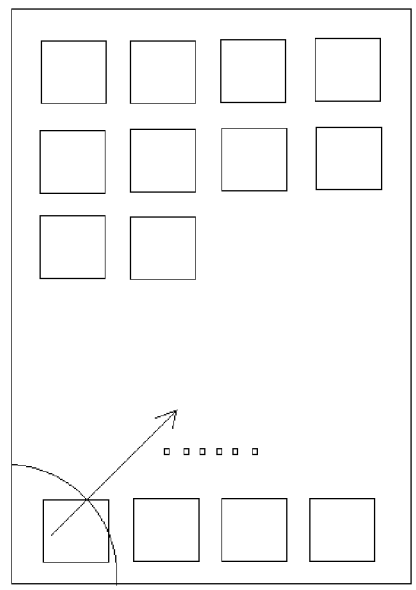
FIG. 3 shows a schematic diagram illustrating a trigger action of a user on a mobile device according to another embodiment of the present invention.

FIG. 3 shows a schematic diagram illustrating the trigger action of the user on the mobile device according to another embodiment of the present invention. As shown in FIG. 3, based on the screen provided by the mobile device, the user may activate the UI by the sliding action from the lower left corner toward the upper right of the screen, and then the UI will be displayed in the lower left corner of the screen. Also, the method may define a valid range for the sliding action from the lower left corner toward the upper right of the screen. FIGS. 2 and 3 merely show two examples of the present invention and should not be considered as a limiting thereof.

Following the step S101, the method 100 goes to step S102, that is, displaying n layers of response region according to the trigger action and displaying non-transparent image in the valid region of each layer of response region. Taking the Android system as an example, the basic unit of the user interface (hereinafter referred to as UI) element in the Android system is "view", which responds to the trigger action as a whole. The view per se may be formed into a rectangular shape. In order to apply the present invention to the Android system or other similar system, the response region of the present invention may also have a rectangular shape. However, in order to provide a sector UI for the user, in the present invention, the response region may be divided into a valid region and an invalid region. Wherein the response region is transparent, the valid region shows non-transparent image, and the non-transparent valid regions of various layers of response region are combined to form the sector UI.

Figure 4:
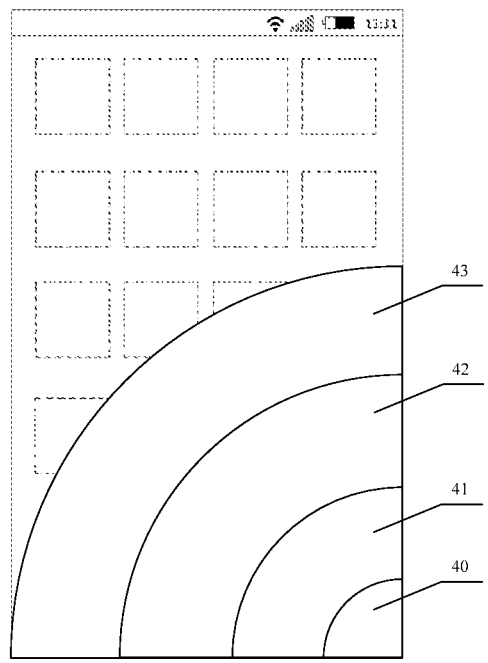
FIG. 4 shows a schematic diagram illustrating a UI according to one embodiment of the present invention.

Description will be given by taking a UI having 4 layers of response region as an example, but the present invention is not limited thereto. FIG. 4 shows a schematic diagram illustrating a UI according to one embodiment of the present invention. The UI as shown in FIG. 4 has 4 layers of response region which have transparent rectangular shapes and overlap at one of their corners or edges with each other. In particular, if the sector UI is required to be displayed in a corner area corresponding to a certain corner of the screen, the 4 layers of response region, with one of their corners, will overlap at that corner of the screen; if the sector UI is required to be displayed in a side edge area corresponding to a certain edge of the screen, the 4 layers of response region, with one of their side edges, will overlap at that edge of the screen. Herein, the mth layer of response region is larger than the m−1th layer of response region, wherein m∈[2, n]. That is, from the $1^{st}$ layer of response region, areas of various layers of response region increase sequentially. Since the response region has the transparent rectangular shape, the response region with rectangular shape could not be seen in FIG. 4, which means the user is unperceptive to the response region.

Figure 5:
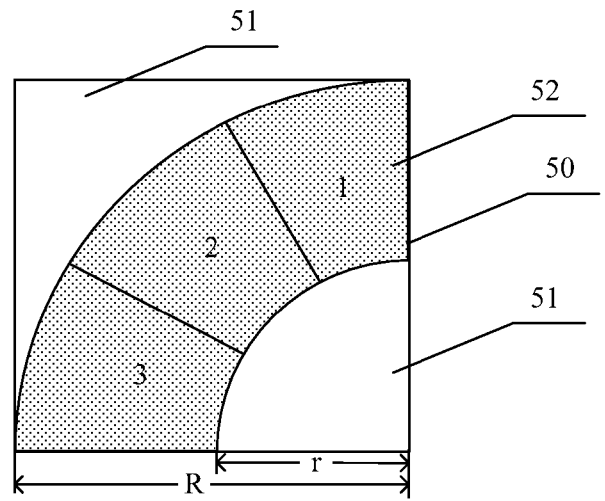
FIG. 5 shows a schematic diagram illustrating the $2^{nd}$ layer of response region in FIG. 4.

At the time of displaying each layer of response region, the valid region of each layer of response region may show the non-transparent image. Since the valid region of each layer of response region shows the non-transparent image, the valid region of each layer of response region could be seen in FIG. 4. As shown in FIG. 4, the valid region 40 of the $1^{st}$ layer of response region is sector region, and the valid region 41 of the $2^{nd}$ layer of response region, the valid region 42 of the $3^{rd}$ layer of response region and the valid region 43 of the $4^{th}$ layer of response region are annulus sector regions. The valid regions of these 4 layers of response regions do not overlap with each other. In order to indicate more apparently a relationship between the valid region and the other region (i.e., invalid region) except the valid region in one layer of response region, description will be given by taking the $2^{nd}$ layer of response region in FIG. 4 as an example. FIG. 5 shows a schematic diagram illustrating the $2^{nd}$ layer of response region in FIG. 4. As shown in FIG. 5, the $2^{nd}$ layer of response region is a rectangular region 50, the valid region 52 of the $2^{nd}$ layer of response region is a annular sector region, and other region except the annular sector region is the invalid region 51. Herein, the valid region refers to a region that may respond to the trigger action of the user, and the invalid region refers to a region that may not respond to the trigger action of the user. Only when the position of the trigger action is in the valid region 52 of the $2^{nd}$ layer of response region, the trigger action would be responded in the $2^{nd}$ layer of response region.

Optionally, displaying the mth layer of response region and displaying the non-transparent image in the valid region of the mth layer of response region may particularly include: after reaching a start presentation time of the mth layer of response region, presenting the mth layer of response region and the non-transparent image corresponding to the mth layer of response region. Herein, the start presentation time of the mth layer of response region is a total of presentation time of the $1^{st}$ to the m−1th layers of response region. That is, after the $1^{st}$ to the m−1th layers of response region are completely presented, the mth layer of response region starts to be presented. In such a technical processing manner, it is possible to realize a smooth transition between layers. Optionally, displaying each layer of response region and the non-transparent image corresponding thereto may be achieved by executing ScaleAnimation. For example, the ScaleAnimation provided by the Android system, which takes a lower right corner (or the lower left corner) of a screen as a reference point for scaling. A scaling value at the time of activation may range from 0-100%. Accordingly, the same manner may also be used at the time of closing, and then the scaling value could range from 100%-0.

Of course, the m layers of response region and the non-transparent images can be displayed by any other known manners in the art. For example, the m layers of the response region and the non-transparent images are displayed simultaneously.

Figure 6:
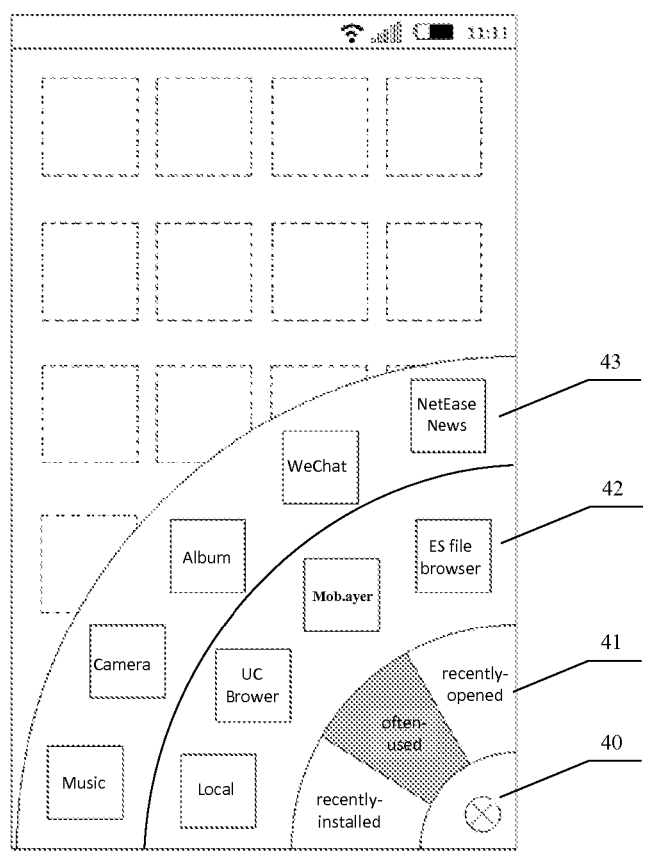
FIG. 6 shows a schematic diagram illustrating the display of UI element in a UI according to one embodiment of the present invention.

Following the step S102, the method 100 goes to step S103, that is, calculating display position(s) of one or more UI elements, and presenting the UI element(s) in the valid region of each layer of response region. FIG. 6 shows a schematic diagram illustrating the display of UI elements in the UI according to one embodiment of the present invention. As shown in FIG. 6, a close UI element for realizing a UI closing function is presented in the valid region of the $1^{st}$ layer of response region. When the user clicks the close UI element, the entire UI interface will be closed. A plurality of tag elements are presented in the valid region of the $2^{nd}$ layer of response region, which are "recently-opened", "often-used" and "recently-installed" respectively. The three tag elements correspond to three sub-classes, which are "most-recently-opened", "most-often-used" and "most-recently-installed" respectively. The "most-recently-opened", based on statistical data of a desktop, extracts a top 9 (of course, more or less than 9 may be also possible) of applications in a sequence of last use time. The "most-often-used", based on statistical data of the desktop, extracts a top 9 of applications in a sequence of use frequency from high to low. The "most-recently-installed", based on data provided by a system database (of the mobile device), extracts a top 9 of applications in a sequence of update time.

According to one embodiment of the present invention, a Section class is used to provide an application list corresponding to the tags. The Section class is an abstract class which realizes abstract interface by sub-classes to provide data to accomplish specific service logic. A parent class of the Section class is java.lang.Object, and its sub-class includes RecentlyInstalledSection, MostUsedSection and RecentUsedSection. The structure of the Section class could be seen in the following tables 1.1, 1.2 and 1.3.

TABLE 1.1

| Constant | | |
|---|---|---|
| Type | Name | Description |
| int | MAX_COUNT | maximum number of apps for a tag |

TABLE 1.2

| Variable | | |
|---|---|---|
| Type | Name | Description |
| protected ArrayList<T> | mContent | Cache of app list corresponding to a tag |

TABLE 1.3

| Interface |
|---|
| public boolean isEmpty( ) |
| Description: whether this tag is a null tag (the number of apps is 0) |
| Parameter: None |
| Return value: boolean value, wherein true indicates the number of apps corresponding to the tag is equal to 0; and false indicates the number of apps corresponding to the tag is unequal to 0 |
| public abstract ArrayList<T> loadIcons(Context context) |
| Description: loading app list corresponding to the tag and the interface is an abstract |
| interface; specific loading logic is implemented by sub-classes. |

TABLE 1.3-continued

Interface

Parameter: context: Android system variable
Return value: app list
public abstract String getSectionName( )
Description: acquiring a name of the tag and an abstract interface, and returning, by the sub-class, a specific name, for example, MostUsedSection returns "most-often-used", RecentUsedSection returns "most-recently-opened" and RecentlyInstalledSection returns "most-recently-installed"
Parameter: None
Return value: name of the tag The applications as mentioned in the tables can be specified by an AppInfo interface type. The AppInfo may be provided by a 360 Mobile Phone Desktop, a main method of which includes getTitle( ) and getIcon( ), which mean to get a title and an icon of an application.

As shown in Table 1.3, an interface mainly realized by the sub-classes of the Section class is the abstract interface loadIcons( ). For example, the sub-class providing data of "most-recently-installed" is RecentlyInstalledSection, which realizes the loadIcons( ) interface by: acquiring all the installed applications firstly, and ordering in a sequence according to update time (lastUpdateTime field, provided by the system) of the applications, extracting a top 9 of the ordered applications; if less than 9, extracting all the applications. The sub-class providing data of "most-often-used" is MostUsedSection, which realizes the loadIcons( ) interface by: acquiring all the installed applications, and ordering in a sequence according to use frequency (calledNum field, statistical data of a desktop and added by 1 each time of opening an application), extracting a top 9 of the ordered applications; if less than 9, extracting all the applications. The sub-class providing data of "most-recently-used" is RecentUsedSection, which realizes the loadIcons( ) interface by: acquiring all the installed applications, and ordering in a sequence according to last use time (lastCalledTime field, statistical data of a desktop and updated to a current time each time of opening an application), extracting a top 9 of the ordered applications; if less than 9, extracting all the applications. In the valid regions of the $3^{rd}$ and the $4^{th}$ layers of response region, it may be presented a plurality of application icon elements which are icons of the applications counted by the sub-class corresponding to the current tag element. Taking FIG. 6 as an example, in the valid region of the $2^{nd}$ layer of response region, the current tag element is "often-used", such that what represented in the $3^{rd}$ and the $4^{th}$ layers of response region are icons of the top 9 of applications in a sequence of use frequency from high to low.

It should be noted, although in the embodiment there are three tag elements presented in the valid region of the $2^{nd}$ layer of response region, it is possible to those of ordinary skills in this art that the number of tag elements could be more or less than three, the detailed description of which will be omitted herein for brevity.

In the step S103, position(s) of UI element(s) may be calculated by a Positions class. The Positions class is a tool class responsible for calculating positions of all the UI elements and packs some general methods of calculating positions of UI elements. These methods are mathematical calculation methods, and all the interfaces of which are static interfaces. The Positions class has a Parent class java.lang.Object but none of direct or indirect sub-class. The structure of the Positions class could be seen in the following tables 2.1 and 2.2.

TABLE 2.1

Constant

| Type | Name | Description |
|---|---|---|
| int | INNER_ITEMS_CAP | maximum number of UI elements a sector can hold |
| double | RADIAN | radian of a 90 degree angle |

TABLE 2.2

Interface public static int[ ] getPosition(int index, int cap, int radius, boolean left)
Description: calculating the coordinates of the UI elements with specified block index value
Parameter:
index: block index value of the UI element
cap: maximum number of UI elements a UI element located region can hold
radius: preset radius of a region where the UI element is located
left: whether the sector is displayed on the left
Return value: Cartesian coordinates of the UI element, expressed by two-dimensional array
public static int[ ] getStartPosition(boolean left)
Remark: calculating the coordinates of start point (origin) of an UI element animation
Parameter: left: whether the sector is displayed on the left
Return value: Cartesian coordinates of the origin, expressed by two-dimensional array
public static double getRadian(int index, int cap)
Remark: calculating a radian of the UI element with a specified block index value in the polar coordinate
Parameter:
index: block index value of the UI element within a certain region
cap: maximum number of UI elements the region can hold
Return value: radian of the UI element in the polar coordinate The coordinates calculated by the Position class may take the lower right corner of the screen (the lower left corner, the upper left corner, the upper right corner and a certain point of one side of the screen are also possible) as an origin, and the Position class also provides a transformation of the calculated coordinates and the system coordinates. In particular, according to a preset radius of each layer of the response region and a block index value of the valid region of this layer of response region corresponding to the UI element, the position of the UI element presented in this layer of response region can be calculated, wherein the block index value is an index value of one of several blocks into which the valid region of the layer of response region is divided. Taking the $2^{nd}$ layer of response region shown in FIG. 5 as an example, the valid region of the $2^{nd}$ layer of response region is divided into 3 blocks, wherein the block index value corresponding to "recently-opened" is 1, the block index value corresponding to "often-used" is 2 and the block index value corresponding to "recently-installed" is 3. Taking the calculation of the position of the UI element "often-used" as an example, with reference to the getRadian( ) interface in the table 2.2, the angel of the UI element position with respect to origin (such as, the lower right corner of the screen) is acquired firstly according to the block index value "2" of the valid region of the $2^{nd}$ layer of response region corresponding to the UI element; then, with reference to the getPosition( ) interface in the table 2.2, x and y coordinates of the UI element position is calculated according to the preset radius and the angle of the $2^{nd}$ layer of response region, whereby acquiring an exact position of the UI element. Assuming that the preset radius is r0 and the angle is $\theta$, it can be calculated that x coordinate of the UI element position is $r0*\cos \theta$, and y coordinate is $r0*\sin \theta$.

Herein, the preset radius r0 of the $2^{nd}$ layer of response region is a value interposed between r and R. In the same manner, the display positions of all the UI elements can be calculated and the UI elements can be presented in respective layers of the sector region of the sector UI. Since all the interfaces of the Position class are mathematical operations, it can be realized by any programming language.

Optionally, displaying the UI elements in the valid region of the mth layer of response region may particularly include: after reaching a start presentation time of the UI elements in the mth layer of response region, presenting the UI elements in the valid region of the mth layer of response region in a from-upper-to-lower order. Herein, the start presentation time of the UI elements in the mth layer of response region is a total of presentation time of the UI elements in the $1^{st}$ to the m−1th layers of response region. That is, after the UI elements in the valid region of the $1^{st}$ to the m−1th layers of response region are completely presented, the UI elements are started to present in the valid region of the mth layer of response region, thereby achieving a smooth transition between displaying of the UI elements in respective layers. Optionally, when presenting application icon elements, the TranslateAnimation provided by the Android system may be used for moving from the lower right corner of the screen to the calculated display position. In order to realize an elastic effect, the animation of each application icon element may be divided into three sections. When retracting the application icon element, it could be reversely performing the animation.

After the UI elements are presented, the user may perform various trigger actions on the sector UI. The mobile device may respond to the trigger actions correspondingly after detecting the trigger actions. Taking FIG. 6 as an example, if the mobile device detects that the user clicks the close UI element within the valid region of the $1^{st}$ layer of response region, then the entire sector UI can be retracted; if the mobile device detects that the user clicks a certain tag element within the valid region of the $2^{nd}$ layer of response region, then an application icon elements corresponding to the tag element can be presented in the valid regions of the $3^{rd}$ and the $4^{th}$ layers of response region; if the mobile device detects that the user clicks a certain application icon element within the valid region of the $3^{rd}$ or the $4^{th}$ layer of response region, then an application corresponding to the application icon element can be opened. The specific process that the mobile device responds to the click action on the sector UI may include: detecting the click action on the UI; calculating the coordinates of the position upon click; according to the coordinates of the position upon click, determining that the response region to which the position upon click belongs is the ith to the nth layers of response region, wherein i∈[1, n]; determining whether the position upon click belongs to the valid region of the ith layer of response region or not, and if yes, responding to the click action in the ith layer of response region; otherwise, updating i to i+1, and repeating this step until i being equal to n+1.

Figure 7:
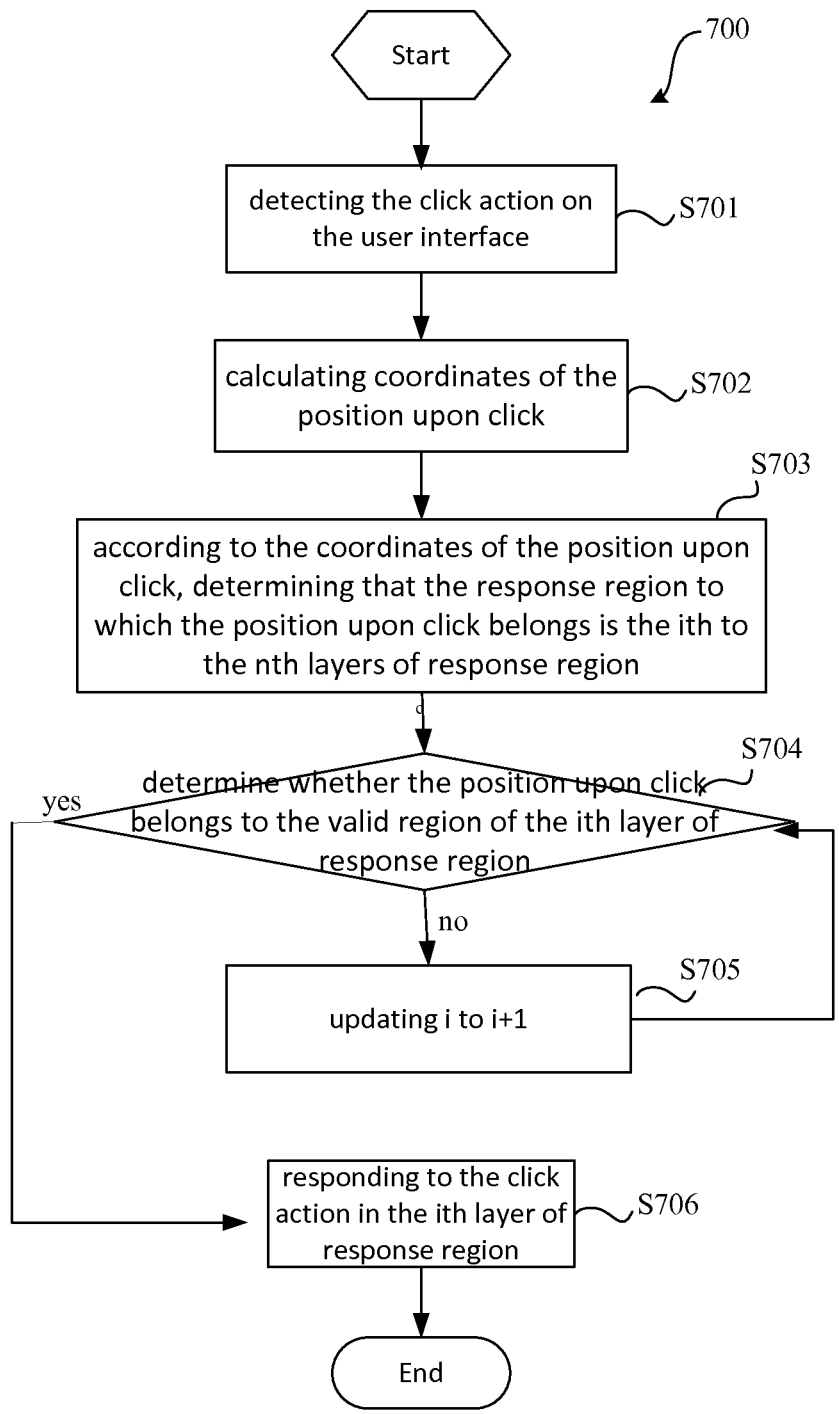
FIG. 7 shows a flow chart illustrating a method of responding to an event on the UI for a mobile device according to one embodiment of the present invention.

FIG. 7 shows a flow chart illustrating a method 700 of responding to an event on a UI for a mobile device according to one embodiment of the present invention. As shown in FIG. 7, the method 700 starts with step S701, that is, detecting a click action on the UI. Based on the UI as shown in FIG. 6, the user may click the UI elements presented thereon, and the click action can be detected by the mobile device.

Following step S701, the method 700 goes to step S702, that is, calculating coordinates of the position upon click. The coordinates of the position upon click refers to coordinates with respect to a coordinate system taking the lower right corner of the screen as an origin. However, after the user triggers a click action, usually, the system may acquire the coordinates of the position with respect to the coordinate system taking the upper left corner of the screen as an origin (i.e., coordinate system of the system) automatically. Therefore, it is required to transform the coordinates.

Following the step S702, the method 700 goes to step S703, that is, according to the coordinates of the position upon click, determining that the response region to which the position upon click belongs is the ith to the nth layers of response region. If the position upon click does not belong to the ith to the nth layers of response region, the method will not respond to the click action and go to the end; if the position upon click belongs to the ith to the nth layers of response region, the method 700 will goes to step S704.

In step S704, it may determine whether the position upon click belongs to the valid region of the ith layer of response region or not, and if yes, go to step S706; otherwise, go to step S705. This step may be performed circularly. Since the basic unit of the UI element in the Android system is called as the view which responds to the trigger action as a whole. However, the view per se is formed into a rectangular shape, which has a portion not overlapping with the sector region. Therefore, it is required to shield this portion from responding to the trigger action and only allow the sector region to respond to the trigger action, so as not to influence responses of other views. Taking FIG. 5 as an example, only when the position upon click belongs to the valid region 52 of the $2^{nd}$ layer of response region, it may respond to the click action in the $2^{nd}$ layer of response region.

Figure 8:
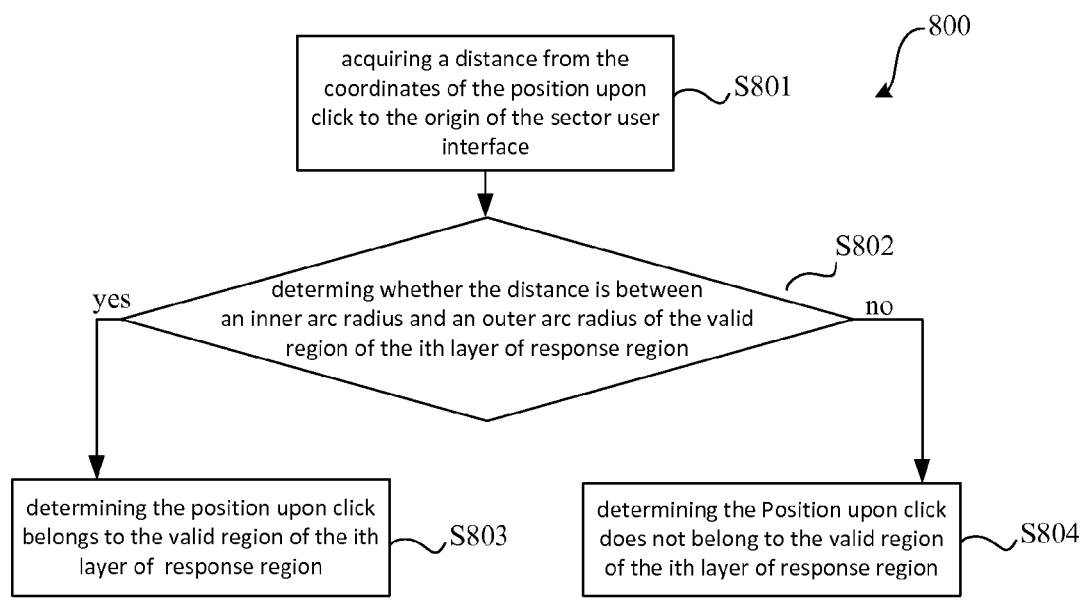
FIG. 8 shows a flow chart illustrating an implementation method of the step S704 in FIG. 7.

FIG. 8 is a flow chart schematically showing a implementation method 800 of the step S704 in FIG. 7. Optionally, the step S704 may include the following steps S801-S804. This method 800 starts with the step S801, that is, acquiring a distance from the coordinates of the position upon click to the origin of the sector UI. In this application, the origin of the sector UI is an end point of a corner where the n layers of response region overlap or a central point of a side edge where the n layers of response region overlap. In the embodiment as shown in FIG. 6, the origin of the UI is the lower left end point of the screen.

Subsequently, according to the distance from the coordinates of the position upon click to the origin of the sector UI, it may judge whether the position upon click belongs to the valid region of the ith layer of the response region.

In particular, following the step S801, the method 800 goes to the step S802, that is, determining whether the distance from the coordinates of the position upon click to the UI is between an inner arc radius and an outer arc radius of the valid region of the ith layer of the response region, and if yes, go to the step S803; otherwise, go to the step S804. As shown in FIG. 5, the valid region of the response region may have an inner arc radius r and an outer arc radius R. For the valid region of the $1^{st}$ layer of response region, the inner arc radius is 0 and the outer arc radius is the radius of the sector region. For each the valid region of the $2^{nd}$ to the nth layers of the response region, the inner arc radius is the inner radius of the annulus sector region, and the outer arc radius is the outer radius of the annulus sector region.

In the step S803, it may determine the position upon click belongs to the valid region of the ith layer of response region, and the method 700 goes to step S706.

In the step S804, it may determine the position upon click does not belong to the valid region of the ith layer of response region, and the method 700 goes to step S705.

In the step S705, it may update i to i+1, and the method 700 goes to the step S704. That is, if the position upon click does not belong to the valid region of the ith layer of response region, it may in turn judge whether the position upon click belongs to the valid region of the i+1th layer of response region.

In the step S706, it may respond to the click action in the ith layer of the response region. Taking FIG. 6 as an example, a close UI element for realizing a sector UI closing function is presented in the valid region of the $1^{st}$ layer of response region. If it is judged that the position upon click belongs to the valid region of the $1^{st}$ layer of response region, this step in the embodiment may particularly include a step of closing the sector UI.

If it is judged that the position upon click belongs to one of the valid regions of the $2^{nd}$ to the nth layers of response region, then it is necessary to determine a first block index value in the valid region of this layer of response region corresponding to the the position upon click, so as to respond to the click action according to the first block index value. The specific process may include: according to the coordinates of the position upon click, acquiring an angle of the position upon click with respect to the origin of the UI; and then according to the angle of the position upon click with respect to the origin of the UI, searching for the first block index value in the valid region of the ith layer of response region corresponding to the click action and responding to the click action according to the first block index value. Herein, the first block index value refers to an index value of one of several blocks into which the valid region of the ith layer of response region is divided. Inside the mobile device system, it may maintain a mapping relation table between the first block index value and an angular range. By determining the angular range to which the angle of the position upon click with respect to the origin of the UI belongs, the mapping relation table can be searched to obtain the first block index value in the valid region of the ith layer of response region corresponding to the click action. Taking the $2^{nd}$ layer of response region in FIG. 6 as an example, since there are 3 tag elements in the valid region of this layer of response region, it is necessary to determine the tag element which the user clicked. First, according to the coordinates of the position upon click, it may acquire the angle of the position upon click with respect to the origin of the sector UI; then judge the preset angular range to which the angle of the position upon click with respect to the origin of the sector UI belongs. If the angle belongs to a first angular range, for example [90°, 120°), it may determine that the first block index value corresponding to the position upon click is 1 by searching the mapping relation table; if the angle belongs to a second angular range, for example [120°, 150°), it may determine that the first block index value corresponding to the position upon click is 2 by searching the mapping relation table; if the angle belongs to a third angular range, for example [150°, 180°], it may determine that a second block index value corresponding to the position upon click is 3 by searching the mapping relation table; and finally it may respond to the touch click event based on the second block index value.

According to one embodiment of the present invention, in FIG. 6, the valid region of the $2^{nd}$ layer of response region presents a plurality of tag elements, and the valid regions of the $3^{rd}$ and the $4^{th}$ layer of response region present a plurality of application icon elements respectively. Herein, the application icon element refers to an application icon used to activate an application of the mobile device. If it is judged that the position upon click belongs to the valid region of the $2^{nd}$ layer of response region, responding to the click action may further include the following step of:

1). placing all the application icon elements of the tag element corresponding to the above determined first block index value into a next application icon layer. IconLayer is an application icon layer, in charge of generation, caching, event processing and interactive animation of an icon. This method defines two IconLayers, which are next application icon layer (Next_IconLayer) and current application icon layer (Current_IconLayer) respectively. Assuming that the first block index value corresponding to the position upon click is 2, the tag element corresponding to this first block index value would be "often-used". Based on statistical data of the desktop, the system extracts a top 9 of applications in a sequence of use frequency from high to low. The application icon elements of these 9 applications may be placed into the next application icon layer.

2). removing all the application icon elements in the current application icon layer, and by carrying out rotation and fade-out animation methods, removing the plurality of application icon elements presented in the valid region of each of the $3^{rd}$ to the nth layers of response region from the screen. The application icon elements in the current application icon layer are those presented in the valid regions of the $3^{rd}$ and the $4^{th}$ layers of response region before the click action occurs, and the application icon elements in the current application icon layer are removed. By carrying out the rotation and fade-out animation methods, the application icon elements in the valid regions of the $3^{rd}$ and the $4^{th}$ layers of response regions are removed from the screen.

3). moving all the application icon elements in the next application icon layer into the current application icon layer, and by carrying out the rotation and fade-in animation methods, presenting the application icon elements in the current application icon layer on the screen.

A switch of tags can be realized by the above steps 1), 2) and 3), and visual effects provided for the user by the above switch would be that: while all the application icons of a original tag rotates out of the screen relative to the centre of the sector, the application icons of a new tag rotates into the screen relative to the centre of the sector, thus realizing a smooth switch of the tags.

Further, in one embodiment of the present invention, the method may also provide a switch of tag indicators while realizing the switch of the tags, which in particularly includes: by carrying out the rotation animation method, moving the tag indicator in the valid region of the $2^{nd}$ layer of response region to a position of the tag element corresponding to the first block index value corresponding to the position upon click in the valid region of the $2^{nd}$ layer of response region. Taking FIG. 6 as an example, assuming that before the click action occurs, the application icon element presented in the valid regions of the $3^{rd}$ and the $4^{th}$ layers of response region is an application corresponding to "recently-installed", the tag indicator (grey area) should be at "recently-installed". After the click action occurs, the tag corresponding to the position upon click is "often-used". At this time, the rotation animation method is carried out to clockwise rotate by 30 degree taking the lower right corner as a centre, and the tag indicator (grey area) in the valid region of the $2^{nd}$ layer of response region is moved to "often-used" (see FIG. 6).

If it is judged that the position upon click belongs to one of the valid regions of the $3^{rd}$ to the nth layers of response region and it is already determined that the position upon click corresponds to the first block index value in the valid region of this layer of the response region, then responding to the click action may in particular include: opening the application corresponding to the application icon element which corresponds to the first block index value. Taking FIG. 6 as an example, if it is judged that the position upon click belongs to the valid regions of the $4^{th}$ layer of response region and it is already determined that the first block index value corresponding to the position upon click in the valid regions of the $4^{th}$ layer of response region is 2 (corresponding to the block of "WeChat"), responding to the click action may in particular include: opening the application "WeChat". Thereby, it is possible to realize an opening of the application corresponding to the application icon element in the UI.

Figure 9:
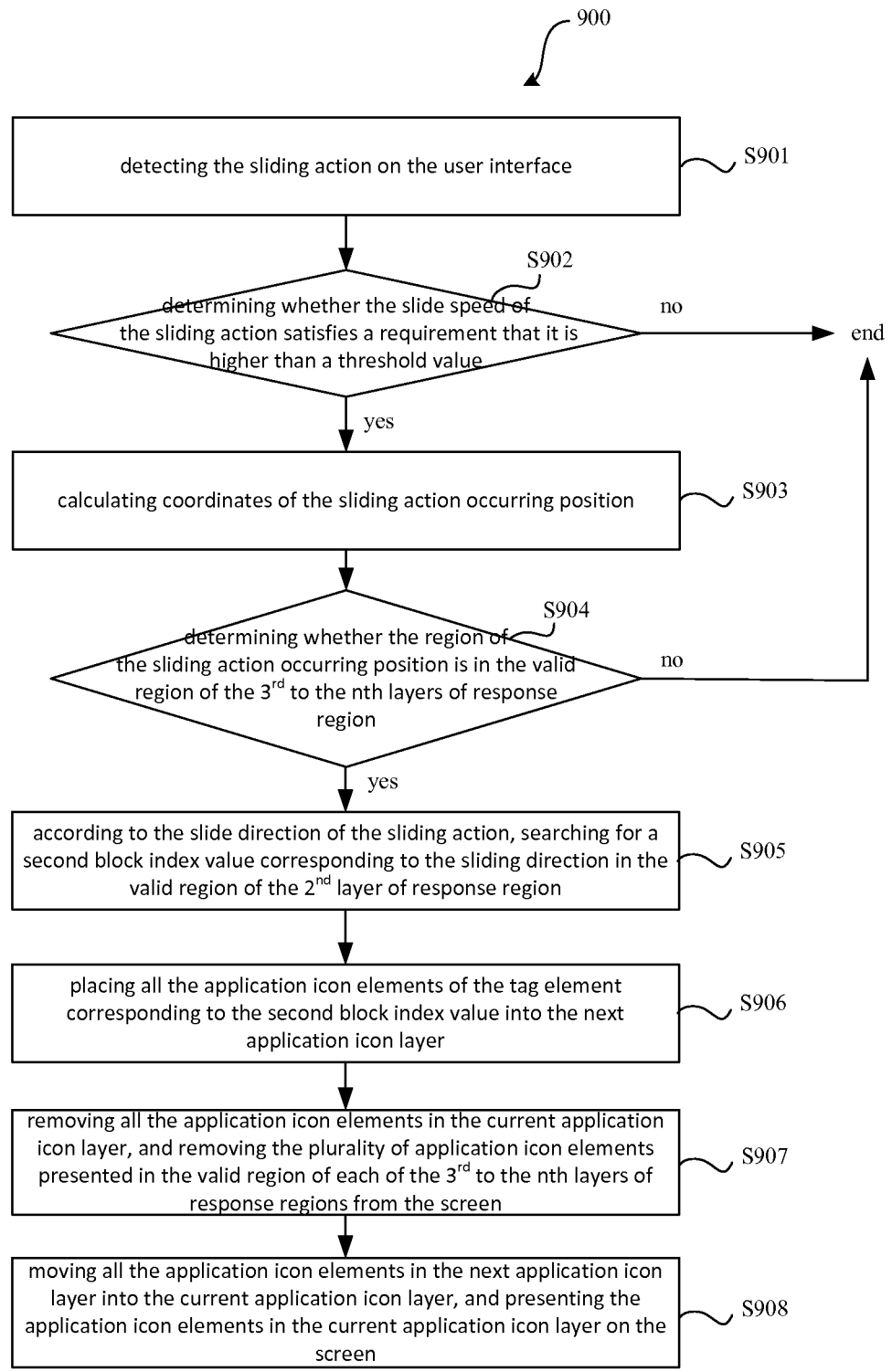
FIG. 9 shows a flow chart illustrating a method of responding to a sliding action by a UI according to one embodiment of the present invention.

Further, the $3^{rd}$ to the nth layers of response region in this embodiment may respond to a sliding action other than the click action. FIG. 9 is a flow chart schematically showing a method 900 of responding to a sliding action by the UI according to one embodiment of the present invention. As shown in FIG. 9, the method 900 starts with step S901, that is, detecting the sliding action on the UI. The user may perform a sliding action in the valid region in any one of the $3^{rd}$ to the nth layers of response region, and the mobile device may determine the sliding action by acquiring a speed and direction of the sliding action by the user on the screen.

Optionally, following the step S901, the method 900 goes to step S902, that is, determining whether the slide speed of the sliding action satisfies a requirement that it is higher than a predefined threshold value, if yes, the method 900 goes to step S903; otherwise, the method 900 ends. In particular, the mobile device may acquire a horizontal slide speed and/or a vertical slide speed of the sliding action, and if any one of the speeds is higher than the predefined threshold value, then the requirement is considered to be satisfied. Misoperation may be prevented by judging the slide speed.

Subsequently, the method 900 goes to the step S903, that is, calculating coordinates of the sliding action occurring position. In particular, the mobile device may acquire start point coordinates and end point coordinates of the sliding action.

Subsequently, the method 900 proceeds with step S904, that is, according to the coordinates of the sliding action occurring position, determining whether the region of the sliding action occurring position belongs to the valid region of the $3^{rd}$ to the nth layers of response region. Generally, if it is judged that the start point coordinates and the end point coordinates of the sliding action are both in the valid region of the $3^{rd}$ to the nth layers of response region, then it may determine that the region of the sliding action occurring position belongs to the valid region of the $3^{rd}$ to the nth layers of response region, and the method 900 goes to step S905; otherwise, it may determine that the region of the sliding action occurring position does not belong to the valid region of the $3^{rd}$ to the nth layers of response region, then no response is made to the sliding action, and the method 900 ends.

In the step S905, according to the slide direction of the sliding action, it may search for the second block index value corresponding to the sliding action in the valid region of the $2^{nd}$ layer of response region. Assuming that the slide speed of the sliding action has components of vx and vy in x and y directions respectively, a speed vector can be indicated by (vx, vy). The slide direction of the sliding action can be determined by a quadrant where the speed vector is positioned, and the quadrant where the speed vector is positioned can be determined by plus and minus signs of vx and vy. If the speed vector is in the first quadrant, then the slide direction would be toward the upper right; and if the speed vector is in the third quadrant, then the slide direction would be toward the lower left. The slide direction of the sliding action may be also determined based on a tangent value of the slide speed. The tangent value of the slide speed (i.e., vy/vx) may be used to calculate an angle according to an inverse trigonometric function, and the angle is in turn compared with a preset angle; or the tangent value of a preset angle may be calculated, and the tangent value of the preset angle is compared with the tangent value of the slide speed according to the monotonicity of a tangent function, whereby determining the slide direction. Taking FIG. 6 as an example, it is assumed that before the sliding action occurs, the valid regions of the $3^{rd}$ and the $4^{th}$ layers of response region present an application icon element corresponding to "often-used", that is, the application icon element in the current application icon layer is/are the application(s) icon element corresponding to "often-used". After the sliding action occurs, if it is determined that the slide direction is toward upper right, that is, the user wants to rotate the application icon element corresponding to "recently-installed" into the screen, then it may be determined that the second block index value corresponding to the slide direction in the valid region of the $2^{nd}$ layer of response region is 3 (the block index value of the block where "recently-installed" is positioned); if it is determined that the slide direction is toward lower left, that is, the user wants to rotate the application icon element corresponding to "recently-opened" into the screen, then it may be determined that the second block index value corresponding to the slide direction in the valid region of the $2^{nd}$ layer of response region is 1 (the block index value of the block where "recently-opened" is positioned). If before the sliding action occurs, the valid regions of the $3^{rd}$ and the $4^{th}$ layers of response region present an application icon element corresponding to "recently-installed", and after the sliding action occurs, if it is determined that the slide direction is toward upper right, then it may be determined that the second block index value corresponding to the slide direction in the valid region of the $2^{nd}$ layer of response region is 1, that is, it may be activated to rotate the application icon element corresponding to "recently-opened" into the screen. Thereby, a circularly displaying effect would be present. In the same manner, if before the sliding action occurs, the valid regions of the $3^{rd}$ and the $4^{th}$ layers of response region present an application icon element corresponding to "recently-opened", and after the sliding action occurs, if it is determined that the slide direction is toward lower left, then it may be determined that the second block index value corresponding to the slide direction in the valid region of the $2^{nd}$ layer of response region is 3, that is, it may be activated to rotate the application icon element corresponding to "recently-installed" into the screen.

Following the step S905, the method goes to step S906, that is, placing all the application icon elements of the tag element corresponding to the second block index value into the next application icon layer. According to the scheme as described above, this method defines two IconLayers, which are the next application icon layer (Next_IconLayer) and the current application icon layer (Current_IconLayer) respectively. Assuming that the second block index value corresponding to the slide direction of the sliding action in the valid region of the $2^{nd}$ layer of response region is 3, and the tag element corresponding to the second block index value is "recently-installed", the mobile device may acquire the data provided by database to extract a top 9 of applications in a sequence of update time and place the applications icon elements of these 9 applications into the next application icon layer.

Subsequently, the method 900 goes to step S907, that is, removing all the application icon elements in the current application icon layer, and by carrying out the rotation and fade-out animation methods, removing the plurality of application icon elements presented in the valid region of each of the $3^{rd}$ to the nth layers of response region from the screen. The application icon elements in the current application icon layer are those presented in the valid regions of the $3^{rd}$ and the $4^{th}$ layers of response region before the sliding action occurs, and the application icon elements in the current application icon layer are removed. By carrying out the rotation and fade-out animation methods, the application icon elements in the valid regions of the $3^{rd}$ and the $4^{th}$ layers of response region are removed from the screen.

Subsequently, the method 900 goes to step S908, that is, moving all the application icon elements in the next application icon layer into the current application icon layer, and by carrying out the rotation and fade-in animation methods, presenting the application icon elements in the current application icon layer on the screen.

Through the above steps S901-S908, it is possible to realize the response to the sliding action on the sector UI, and the result of the response is the switch of the tags. The visual effects provided for the user by the above switch would be that, while all the application icons of the original tag rotates out of the screen relative to the centre of the sector, the application icons of the new tag rotates into the screen relative to the centre of the sector, thus realizing a smooth switch of the tags.

Further, the method may also provide a switch of tag indicator while realizing the switch of the tag, which in particularly includes: by carrying out the rotation animation method, moving the tag indicator in the valid region of the $2^{nd}$ layer of response region to a position of the tag element corresponding to the above second block index value.

In this method, the sector UI may provide the user with a convenient access to opening an application corresponding to the UI element. This access is global, which may solve a problem that it is difficult for the user to search applications when using a smart terminal. The mobile device can display the sector UI according to the user's trigger action and provide a convenient and flexible activation, without affecting operations of other applications and aesthetics of the entire UI. The sector UI may comprise n layers of response region, each of which can present one or more UI element so as to provide a number of applications. By judging the gestures, the method may provide the user with a number of gesture operations such as a slide for activating the interface, switching the tags, a click for opening an application and the like.

In this method, the $2^{nd}$ layer of the sector region of the sector UI may present a plurality of tag elements, each of which corresponds to the same kind of applications, so as to specifically provide the user with various kinds of applications, satisfy the user's requirement on searching applications, facilitate the search manners and improve the efficiency of search. Main interface of the sector UI may be displayed at the lower right (lower left) of the screen, such that the user may manipulate the sector UI using a single thumb, and both of right and left hands could be used. Further, in this method, the sector UI and the UI elements could be displayed in a plurality of animation effects and provide a fluent UI interaction for the user.

Figure 10:
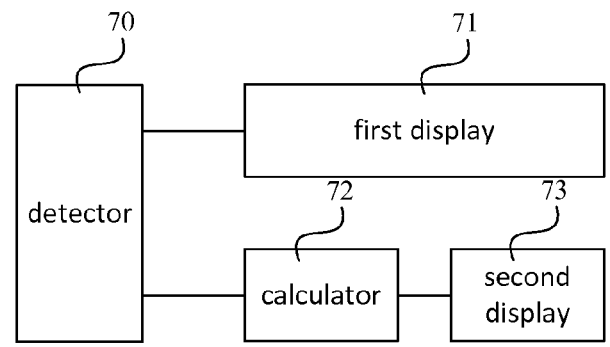
FIG. 10 shows a structural block diagram illustrating a mobile device according to one embodiment of the present invention.

FIG. 10 is a structural block diagram schematically showing a mobile device according to one embodiment of the present invention. As shown in FIG. 10, the mobile device may include: a detector 70, a first display 71, a calculator 72 and a second display 73.

Herein, the detector 70 is configured to detect a trigger action on the mobile device. The detector 70 could activate the display of a UI by detecting the trigger action of the user on the mobile device. Herein, the trigger action may include a click or a double-click action on a designated button; or a sliding action from the lower right corner toward the upper left of a screen; or a sliding action from the lower left corner toward the upper right of a screen; or a sliding action from the upper right corner toward the lower left of a screen; or a sliding action from the upper left corner toward the lower right of a screen; or a sliding action from one side edge toward the opposite side of a screen; or the like. Whereas, the above mentioned trigger actions should not be considered as limiting the scope of the present invention. As shown in FIG. 2, based on the screen provided by the mobile device, the user may activate the UI by the sliding action from the lower right corner toward the upper left of the screen, and then the UI will be displayed in the lower right corner of the screen. The mobile device may define a valid range for the sliding action. If a coordinate system is established by taking the lower right corner of the screen as an origin, the valid range may be defined as an angular range [110°, 210°]. The angular range may be determined based on a vector related gesture, and the starting point of which is not necessarily positioned at the origin of the coordinate system. If the vector angle of the user's sliding action is within the valid range, the detector 70 can capture that action to further activate the UI. The specific judgement may be dependent on a tangent value which is able to indicate angle. For example, the valid range is set to a tangent value range, such as [tg 110°, tg 210°]. After the detector 70 has detected the sliding action on the mobile device, it may proceed to calculate, based on coordinates of the starting point and the ending point of the sliding action, the tangent value of the vector angle of the sliding action, and to decide whether the tangent value falls in the above tangent value range; if so, the UI will be activated. As shown in FIG. 3, a sector flag 30 is displayed at lower left corner of the mobile device's screen, which is used to indicate that the user may activate the UI by the sliding action from the lower left corner toward the upper right of the screen. The mobile device may also define a valid range for the sliding action from the lower left corner toward the upper right of the screen. FIGS. 2 and 3 merely show two examples of the present invention and should not be considered as a limiting thereof.

The first display 71 is configured to, in response to the trigger action detected by the detector 70, display n layers of response region and display non-transparent image in a valid region of each layer of response region. Description will be given by taking the UI having 4 layers of response region as an example. As shown in FIG. 4, it shows the UI having 4 layers of response region, which have transparent rectangular shapes and overlap at one of their corners or edges with each other. In particular, if the sector UI is required to be displayed in a corner area corresponding to a certain corner of the screen, the corners of the 4 layers of response region, with one of their corners, will overlap at that corner of the screen; if the sector UI is required to be displayed in a side edge area corresponding to a certain edge of the screen, the 4 layers of response region, with one of their side edges, will overlap at that edge of the screen. The mth layer of response region is larger than the m−1th layer of response region, wherein m∈[2, n]. That is, from the 1st layer of response region, areas of various layers of response region increase sequentially. Since the response region has the transparent rectangular shape, the response region with rectangular shape could not be seen in FIG. 4, which means the user is unperceptive to the response region. At the time of displaying each layer of response region, the valid region of each layer of response region may show non-transparent image. Since the valid region of each layer of response region shows the non-transparent image, the valid region of each layer of response region could be seen in FIG. 4. As shown in FIG. 4, the valid region 40 of the 1st layer of response region is sector region, and the valid region 41 of the 2nd layer of response region, the valid region 42 of the 3rd layer of response region and the valid region 43 of the 4th layer of response region are annulus sector regions. The valid regions of these 4 layers of response regions do not overlap with each other. In order to indicate more apparently a relationship between the valid region and the other region (i.e., invalid region) except for the valid region in one layer of response region, as shown in FIG. 5, the 2nd layer of response region is a rectangular region 50, the valid region 52 of the 2nd layer of response region is a annular sector region, and other region except for the annular sector region is the invalid region 51. Herein, the valid region refers to a region that may respond to the trigger action of the user, and the invalid region refers to a region that may not respond to the trigger action of the user. Only when the occurring position of the trigger action belongs to the valid region 52 of the 2nd layer of response region, the trigger action could be responded in the 2nd layer of response region. Optionally, the first display 71 may be further configured to, for the mth layer of response region, after reaching a start presentation time of the mth layer of response region, present the mth layer of response region and the non-transparent image corresponding to the mth layer of response region; wherein, the start presentation time of the mth layer of response region is a total of presentation time of the 1st to the m−1th layers of response region. That is, after the 1st to the m−1th layers of response region are completely presented, the mth layer of response region starts to be presented. In such a technical processing manner, it is possible to reach a smooth transition between the layers. Optionally, displaying of each layer of response region and the non-transparent image corresponding thereto may be achieved by executing ScaleAnimation. For example, the ScaleAnimation provided by the Android system, which takes the lower right corner (or the lower left corner) of the screen as a reference point for scaling. A scaling value at the time of activation may range from 0-100%. Accordingly, the same manner may also be used at the time of closing, and then the scaling value could range from 100%-0. Of course, the m layers of response region and the non-transparent image can be displayed by any other methods known in the art. For example, the m layers of response region and the non-transparent image are displayed simultaneously.

The calculator 72 is configured to calculate display position(s) of one or more UI element. The calculator 72 is further configured to, according to a preset radius of each layer of response region and a block index value of the valid region of this layer of response region corresponding to the UI element, calculate a position of the UI element presented in this layer of response region, wherein, the block index value is an index value of one of several blocks into which the valid region of the response region is divided. In particular, the position of the UI element can be uniformly calculated by the Position class. The Position class is a tool class in charge of calculating positions of all UI elements. The coordinates calculated by the Position class may take the lower right corner of the screen (the lower left corner, the upper left corner, the upper right corner or a point on one side of the screen are also possible) as an origin, and also provide a transformation of the system coordinate. For the detailed description of the Position class please refer to the relevant context of the method embodiment. Taking the 2nd layer of response region as shown in FIG. 5 as an example, the valid region of the 2nd layer of response region is divided into 3 blocks, wherein the block index value corresponding to "recently-opened" is 1, the block index value corresponding to "often-used" is 2 and the block index value corresponding to "recently-installed" is 3. Taking the calculation of the position of the UI element "often-used" as an example, first, the angle of the UI element with respect to the origin (such as, the lower right corner of the screen) is acquired according to the block index value "2" of the valid region of the 2nd layer of response region corresponding to the UI element; then, x and y coordinates of the UI element position is calculated according to the preset radius and the angle of the 2nd layer of response region, whereby acquiring an exact position of the UI element. Assuming that the preset radius is r0 and the angle is θ, it can be calculated that x coordinate of the UI element is r0*cos θ, and y coordinate is r0*sin θ. Herein, the preset radius r0 of the 2nd layer of response region is a value interposed between r and R. In the same manner, display positions of all UI elements can be calculated and the UI elements can be presented in respective layers of the sector regions of the sector UI.

The second display 73 is configured to, according to the calculated result of the calculator 72, present the UI elements in the valid region of each layer of response region. As shown in FIG. 6, a close UI element for realizing a UI closing function is presented in the valid region of the 1st layer of response region. When the user clicks the close UI element, the entire UI interface will be closed. A plurality of tag elements are presented in the valid region of the 2nd layer of response region, which are "recently-opened", "often-used" and "recently-installed" respectively. The three tag elements correspond to three sub-classes, which are "most-recently-opened", "most-often-used" and "most-recently-installed" respectively. The "most-recently-opened", based on statistical data of desktop, extracts a top 9 of applications in a sequence of last use time. The "most-often-used", based on statistical data of desktop, extracts a top 9 of applications in a sequence of use frequency from high to low. The "most-recently-installed", based on data provided by the system database (of the mobile device), extracts a top 9 of applications in a sequence of update time. The three sub-classes inherit the Section class and realize abstract interfaces to provide data. For the detailed description of the Section class please refer to the context of method embodiment. The valid regions of the 3rd and the 4th layers of response region may present a plurality of application icon elements which are icons of the applications counted from the sub-class corresponding to the current tag element. Taking FIG. 6 as an example, in the valid region of the 2nd layer of response region, the current tag element is "often-used", such that 3rd and the 4th layers of response region present icons of the top 9 of applications in a sequence of use frequency from high to low. It should be noted, although in the embodiment the valid region of the 2nd layer of response region presents three tag elements, more or less than three tag elements may be also possible, the detailed description of which will be omitted herein. The second display 73 may be further configured to, for the mth layer of response region, after reaching a start presentation time of the UI elements in the mth layer of response region, present the UI elements in the valid region of the mth layer of response region in a from-upper-to-lower order. Herein, the start presentation time of the UI elements in the mth layer of response region is a total of presentation time of the UI elements in the $1^{st}$ to the m−1th layers of response region. That is, after the UI elements in the valid region of the $1^{st}$ to the m−1th layers of response region are completely presented, the UI elements are started to present in the valid region of the mth layer of response region, achieving a smooth transition between displaying of the UI elements in respective the layers. Optionally, when presenting application icon elements, the TranslateAnimation provided by the Android system may be used for moving from the lower right corner to the calculated display position of the screen. In order to realize an elastic effect, the animation of each application icon element may be divided into three sections. When retracting the application icon element, it is possible to reversely perform the animation.

After the UI element is presented, the user may perform various trigger actions on the sector UI. The mobile device may respond to the trigger actions correspondingly after detecting the trigger actions. Taking FIG. 6 as an example, if the mobile device detects that the user clicks the close UI element within the valid region of the $1^{st}$ layer of response region, then the entire sector UI may be retracted; if the mobile device detects that the user clicks a certain tag element within the valid region of the $2^{nd}$ layer of response region, then an application icon element corresponding to the tag element may be presented in the valid regions of the $3^{rd}$ and the $4^{th}$ layers of response region; if the mobile device detects that the user clicks a certain application icon element within the valid region of the $3^{rd}$ or the $4^{th}$ layer of response region, then an application corresponding to the icon element may be opened.

In the mobile device provided by the present invention, the sector UI may provide the user with a convenient access to opening an application corresponding to the UI element. This access is global, which may solve a problem that it is difficult for the user to search applications when using a smart terminal. The mobile device can display the sector UI according to the user's trigger action and provide a convenient and flexible activation, without affecting operations of other applications and aesthetics of the entire UI. The sector UI may comprise n layers of response region, each of which can present one or more UI elements so as to provide a number of applications. By judging the gestures, the present invention may provide the user with a number of gesture operations such as a slide for activating the interface, switching the tags, a click for opening application and the like.

In the mobile device provided by the present invention, the $2^{nd}$ layer of the sector region of the sector UI may present a plurality of tag elements, each of which corresponds to the same kind of applications, so as to specifically provide the user with various kinds of applications, satisfy the user's requirement on searching applications, facilitate the search manners and improve the efficiency of search. Main interface of the sector UI may be displayed at the lower right (the lower left) of the screen, such that the user may manipulate the sector UI using a single thumb, and both of right and left hands could be used. Further, in this mobile device, the sector UI and the UI elements could be displayed in a plurality of animation effects and provide a fluent UI interaction for the user.

Algorithm and display provided herein is not inherently related to a particular computer, virtual system or other equipment. Various universal systems may also be used with the teaching based on the present invention. According to the above description, the required structure for such a system is obvious. In addition, the present invention is not directed to any particular programming languages. It should be understood that a variety of programming languages can be used to implement the disclosed invention as described herein and the above description to the particular programming language is to disclose the implementation mode of the present invention.

Each of components according to the embodiments of the present invention can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the members of terminal devices according to the embodiments of the present invention. The present invention may further be implemented as equipments or device programs (for example, computer programs and computer program products) for executing some or all of the methods as described herein. The programs for implementing the present invention may be stored in the computer readable medium, or have a form of one or more signal. Such a signal may be downloaded from the internet websites, or be provided in carrier, or be provided in other manners.

Figure 11:
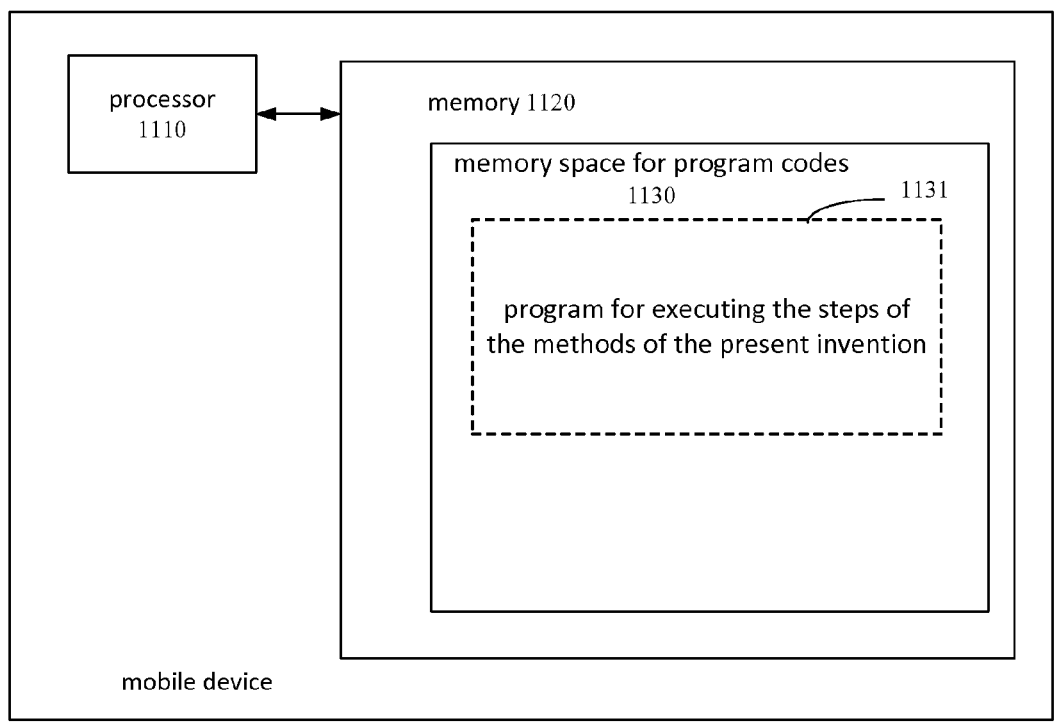
FIG. 11 shows a block diagram illustrating a mobile device used to execute the implementation method of UI for the mobile device according to the present invention.
Figure 12:
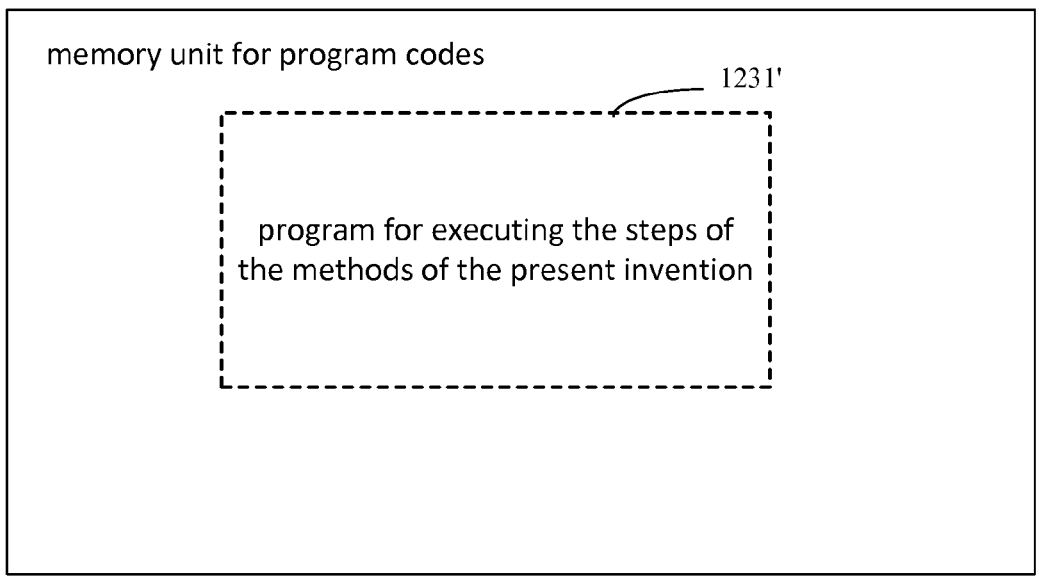
FIG. 12 shows a memory cell used to store or carry program codes for executing the implementation method of UI for the mobile device according to the present invention.

For example, FIG. 11 is a block diagram schematically showing a mobile device which is used to execute the implementation method of UI for the mobile device according to the present invention. Traditionally, the mobile device comprises a processor 1110 and a computer program product or a computer readable medium in form of a memory 1120. The memory 1120 may be electronic memories such as flash memory, EEPROM (Electrically Erasable Programmable Read-Only Memory), EPROM, hard disk or ROM. The memory 1120 has a memory space 1130 for program codes 1131 executing any steps of the above methods. For example, the memory space 1130 for program codes may comprise respective program codes 1131 for implementing the various steps in the above mentioned methods. These program codes may be read from or be written into one or more computer program products. These computer program products comprise program code carriers such as hard disk, compact disk (CD), memory card or floppy disk. These computer program products are usually the portable or stable memory cells as shown in reference FIG. 12. The memory cells may be provided with memory sections, memory spaces, etc., similar to the memory 1120 of the server as shown in FIG. 11. The program codes may be compressed in an appropriate form. Usually, the memory cell includes computer readable codes 1231' which can be read by processors such as 1110. When these codes are operated on the mobile device, the mobile device may execute each step as described in the above methods.

The terms "one embodiment", "an embodiment" or "one or more embodiment" used herein means that, the particular feature, structure, or characteristic described in connection with the embodiments may be included in at least one embodiment of the present invention. In addition, it should be noticed that, for example, the wording "in one embodiment" used herein is not necessarily always referring to the same embodiment.

A number of specific details have been described in the specification provided herein. However, it should be understood that the embodiments of the present invention may be practiced without these specific details. In some examples, in order not to confuse the understanding of the specification, the known methods, structures and techniques are not shown in detail.

It should be noticed that the above-described embodiments are intended to illustrate but not to limit the present invention, and alternative embodiments can be devised by the person skilled in the art without departing from the scope of claims as appended. In the claims, any reference symbols between brackets should not form a limit of the claims. The wording "comprising/comprise" does not exclude the presence of elements or steps not listed in a claim. The wording "a" or "an" in front of element does not exclude the presence of a plurality of such elements. The present invention may be achieved by means of hardware comprising a number of different components and by means of a suitably programmed computer. In the unit claim listing a plurality of devices, some of these devices may be embodied in the same hardware. The wordings "first", "second", and "third", etc. do not denote any order. These wordings can be interpreted as a name.

It should also be noticed that the language used in the present specification is chosen for the purpose of readability and teaching, rather than selected in order to explain or define the subject matter of the present invention. Therefore, it is obvious for an ordinary skilled person in the art that modifications and variations could be made without departing from the scope and spirit of the claims as appended. For the scope of the present invention, the disclosure of the present invention is illustrative but not restrictive, and the scope of the present invention is defined by the appended claims.

The invention claimed is:

1. An implementation method of user interface for a mobile device, comprising:
   detecting a single trigger action on the mobile device;
   in response to the single trigger action, displaying n layers of response region,
   wherein n>1, the n layers of response region are transparent rectangle, and overlap at one of their corners or edges,
   wherein a mth layer of response region is larger than a m−1th layer of response region, m∈[2, n],
   wherein each layer of response region comprises a valid portion and an invalid portion, each layer of response region responds to a touch gesture when a position of the touch gesture is in the valid portion, each layer of response region does not respond to the touch gesture when the position of the touch gesture is in the invalid portion, and the valid portion of each layer of response region does not overlap with each other, and
   wherein a valid portion of a first layer of response region is sector-shaped, and a valid portion of a nth layer of response region is annulus-sector-shaped;
   determining corresponding positions of displaying one or more user interface elements;
   presenting the one or more user interface elements in one or more valid portions of one or more layers of response region based on the determined corresponding positions;
   wherein the method further comprises:
      when displaying each layer of response region, displaying a non-transparent image in the valid portion of each layer of response region at the same time; and
      for the mth layer of response region, after reaching a start presentation time of the mth layer of response region, presenting the mth layer of response region and the non-transparent image corresponding to the mth layer of response region, wherein the start presentation time of the mth layer of response region is a total of presentation time of the $1^{st}$ to the m−1th layers of response region.

2. The method as claimed in claim 1, wherein, the determining corresponding positions of displaying one or more user interface elements further comprises: according to a preset radius of each layer of response region and a block index value of the valid region of the layer of response region corresponding to the user interface element(s), calculating position(s) of the user interface element(s) presented in the layer of response region, wherein the block index value is an index value of one of several blocks into which the valid region of the layer of response region is divided.

3. The method as claimed in claim 2, wherein, the presenting the one or more user interface elements in one or more valid portions of one or more layers of response region based on the determined corresponding positions further comprises:
   for the mth layer of response region, after reaching a start presentation time of the user interface elements in the mth layer of response region, presenting the user interface elements in the valid region of the mth layer of response region in a from-upper-to-lower order; wherein, the start presentation time of the user interface elements in the mth layer of response region is a total of presentation time of the user interface elements in the $1^{st}$ to the m−1th layers of response region.

4. The method as claimed in claim 1, wherein, the single trigger action comprises: a click or a double-click action on a designated button; or a sliding action from the lower right corner toward the upper left of a screen; or a sliding action from the lower left corner toward the upper right of a screen; or a sliding action from the upper right corner toward the lower left of a screen; or a sliding action from the upper left corner toward the lower right of a screen; or a sliding action from one side toward the opposite side of a screen.

5. The method as claimed in claim 1, wherein, the presenting the one or more user interface elements in one or more valid portions of one or more layers of response region based on the determined corresponding positions further comprises:
   presenting a close user interface element for realizing a user interface closing function in the valid region of the $1^{st}$ layer of response region; presenting a plurality of tag elements in the valid region of the $2^{nd}$ layer of response region; and presenting a plurality of application icon elements in the valid regions of the $3^{rd}$ to the nth layers of response region.

6. A mobile device, comprising:
   a processor; and
   a memory communicatively coupled to the processor to configure the processor at least to: detect a single trigger action on the mobile device;
   in response to the single trigger action, display n layers of response region,
   wherein n>1, the n layers of response region are rectangular region, and overlap at one of their corners or edges,
   wherein a mth layer of response region is larger than a m−1th layer of response region, m∈[2, n],
   wherein each layer of response region comprises a valid portion and an invalid portion, each layer of response region responds to a touch gesture when a position of the touch gesture is in the valid portion, each layer of response region does not respond to the touch gesture when the position of the touch gesture is in the invalid portion, and the valid portion of each layer of response region does not overlap with each other, and wherein a valid portion of a first layer of response region is a sector-shaped, and a valid region of a nth layer of response region is annulus-sector-shaped;

determine corresponding positions of displaying one or more user interface elements; and present the one or more user interface elements in one or more valid portions of one or more layers of response region based on the determined corresponding positions;

wherein the memory further configures the processor to:

when displaying each layer of response region, display a non-transparent image in the valid portion of each layer of response region at the same time; and for the mth layer of response region, after reaching a start presentation time of the mth layer of response region, present the mth layer of response region and the non-transparent image corresponding to the mth layer of response region, wherein the start presentation time of the mth layer of response region is a total of presentation time of the $1^{st}$ to the m−1th layers of response region.

7. The mobile device as claimed in claim 6, the memory further configuring the processor to:

according to a preset radius of each layer of response region and a block index value of the valid region of the layer of response region corresponding to the user interface element(s), calculate position(s) of the user interface element(s) presented in the layer of response region, wherein the block index value is an index value of one of several blocks into which the valid region of the layer of response region is divided.

8. The mobile device as claimed in claim 7, the memory further configuring the processor to:

for the mth layer of response region, after reaching a start presentation time of the user interface elements in the mth layer of response region, present the user interface elements in the valid region of the mth layer of response region in a from-upper-to-lower order; wherein, the start presentation time of the user interface elements in the mth layer of response region is a total of presentation time of the user interface elements in the $1^{st}$ to the m−1th layers of response region.

9. The mobile device as claimed in claim 6, the memory further configuring the processor to detect the following trigger action on the mobile device, wherein the following trigger action comprises a click or a double-click action on a designated button; a sliding action from the lower right corner toward the upper left of a screen; a sliding action from the lower left corner toward the upper right of a screen; a sliding action from the upper right corner toward the lower left of a screen; a sliding action from the upper left corner toward the lower right of a screen; or a sliding action from one side toward the opposite side of a screen.

10. The mobile device as claimed in claim 6, the memory further configuring the processor to:

present a close user interface element for realizing a user interface closing function in the valid region of the $1^{st}$ layer of response region; present a plurality of tag elements in the valid region of the $2^{nd}$ layer of response region; and present a plurality of application icon elements in the valid regions of the $3^{rd}$ to the nth layers of response region.

11. A non-transitory computer readable medium, having instructions stored thereon that, when executed by at least one processor, cause the at least one processor to perform operations for implementation of user interface for a mobile device, the operations comprising:

detecting a single trigger action on the mobile device;

in response to the single trigger action, displaying n layers of response region, wherein n>1, the n layers of response region are transparent rectangle, and overlap at one of their corners or edges, wherein a mth layer of response region is larger than a m−1th layer of response region, m∈[2, n], wherein each layer of response region comprises a valid portion and an invalid portion, each layer of response region responds to a touch gesture when a position of the touch gesture is in the valid portion, each layer of response region does not respond to the touch gesture when the position of the touch gesture is in the invalid portion, and the valid portion of each layer of response region does not overlap with each other, and wherein a valid portion of a first layer of response region is sector-shaped, and a valid portion of a nth layer of response region is annulus-sector-shaped;

determining corresponding positions of displaying one or more user interface elements; and presenting the one or more user interface elements in one or more valid portions one or more layers of response region based on the determined corresponding positions;

wherein the operations further comprise:

when displaying each layer of response region, displaying a non-transparent image in the valid portion of each layer of response region at the same time; and for the mth layer of response region, after reaching a start presentation time of the mth layer of response region, presenting the mth layer of response region and the non-transparent image corresponding to the mth layer of response region, wherein the start presentation time of the mth layer of response region is a total of presentation time of the $1^{st}$ to the m−1th layers of response region.

* * * * *